United States Patent Office 3,753,935
Patented Aug. 21, 1973

3,753,935
NONYELLOWING ACRYLIC ENAMEL CONTAINING AN ACID PHOSPHATE CATALYST
Lester I. Miller, Flint, Mich., assignor to E. I. du Pont de Nemours and Company, Wilmington, Del.
No Drawing. Continuation-in-part of abandoned application Ser. No. 157,664, June 28, 1971. This application June 30, 1972, Ser. No. 268,047
Int. Cl. C08f 21/04; C08g 17/16; C09d 3/66
U.S. Cl. 260—22 CA         11 Claims

ABSTRACT OF THE DISCLOSURE

An improved acrylic enamel that does not yellow on curing at elevated temperatures and has as the film-forming binder a blend of (1) an acrylic polymer that contains in the backbone a vinyl oxazoline ester and (2) an alkyd resin and contains in combination therewith an acid phosphate catalyst; the enamel is useful as an exterior finish for motor vehicles and is particularly useful for repairing damaged finishes of automobiles and trucks.

CROSS REFERENCE TO RELATED APPLICATIONS

This application is a continuation-in-part of my copending application, Ser. No. 157,664, filed June 28, 1971, now abandoned.

BACKGROUND OF THE INVENTION

This invention relates to a coating composition and, in particular, to a nonyellowing acrylic enamel coating composition.

Acrylic enamel coating compositions are widely used for painting automobiles, trucks and appliances and are used to refinish damaged automobile and truck bodies. One particularly high quality acrylic enamel that is used as a primary coating and as a refinish enamel is described in Miller and Walus U.S. Pat. 3,585,160, issued June 15, 1971. This enamel has excellent adherence to an uncoated, primed, enamel coated or lacquer coated metal substrate and dries rapidly to a high gloss, smooth, durable and weatherable finish. However, this enamel upon curing at elevated temperatures develops a slight yellow color which is not acceptable for white or other light colored paints. The improved composition of this invention obviates this problem and provides a finish of the same high quality but the finish does not yellow when cured at elevated temperatures and under end use conditions.

SUMMARY OF THE INVENTION

In the coating composition of this invention which comprises 5–60% by weight of a polymer blend and 95–40% by weight of a solvent for the polymer blend in which the blend consists essentially of (1) 40–95% by weight of an acrylic vinyl oxazoline ester polymer that has a relative viscosity of about 1.03–1.30 measured according to ASTM–D–445–46–T, Method B at 5° C. and which consists essentially of a backbone of 50–96.5% by weight, based on the weight of the polymer, of polymerized ethylenically unsaturated monomers selected from the group consisting of an alkyl methacrylate having 1–8 carbon atoms in the alkyl group, cyclohexyl methacrylate, acrylonitrile, styrene and mixtures of these monomers and the backbone can contain up to 20% by weight, based on the weight of the polymer of hydroxy alkyl methacrylate or hydroxy alkyl acrylate monomers having 2–4 carbon atoms in the alkyl groups and contains in the backbone 3–35% by weight, based on the weight of the polymer, of polymerized vinyl oxazoline esters of the formula

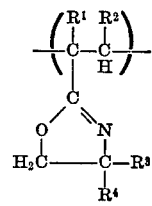

and has attached to the polymer backbone 0.5–15% by weight, based on the weight of the polymer, of pendent amino ester groups of the formula

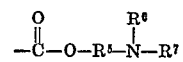

wherein $R^1$ is a hydrocarbon group having 2–20 carbon atoms;
$R^2$ is selected from the group consisting of hydrogen and an alkyl group having 1–4 carbon atoms;
$R^3$ and $R^4$

$R^5$ is an aliphatic hydrocarbon group having 1–6 carbon atoms;
$R^6$ and $R^7$ are individually selected from the group consisting of hydrogen, a saturated aliphatic hydrocarbon group having 1–6 carbon atoms; and
$R^8$ is from drying oil fatty acids, and correspondingly, (2) 5–60% by weight of an alkyd resin or a blend of alkyd resins;

wherein the alkyd resin is the esterification product of drying oil fatty acids, a polyhydric alcohol and an aromatic dicarboxylic acid or an anhydride thereof or a mixture of an aromatic dicarboxylic acid and an anhydride of an aromatic dicarboxylic acid;

the improvement used with the above composition comprises the addition of 0.1–4.0% by volume, based on the volume of the coating composition, of an acid catalyst solution which is blended with the composition;

the acid catalyst solution comprises: 1–50% by weight of an alkyl acid phosphate having 1–12 carbon atoms in the alkyl group and correspondingly, 99–50% by weight of an organic solvent for the catalyst that is compatible with the coating composition and the solution has an acid number of about 4–250.

DESCRIPTION OF THE INVENTION

The coating composition of this invention contains about 5–60% by weight of a film-forming polymer blend of about 40–95% by weight of a vinyl oxazoline polymer and 5–60% by weight of an alkyd resin, or an acrylic resin. Preferably, the coating composition contains as the film-forming polymer blend of about 50–75% by weight of the vinyl oxazoline polymer, and correspondingly, 50–25% by weight of an alkyd resin or an acrylic resin.

The acid number is the milligrams of potassium hydroxide required to neutralize 1 gram of solid material.

The vinyl oxazoline polymer provides the coating composition with rapid air drying characteristics and excellent adhesion to substrates, such as primed or unprimed steel, alkyd enamels, alkyd melamine enamels, acrylic lacquers and the like. The polymer preferably has a relative viscosity of about 1.03–1.30, and preferably, a viscosity of about 1.05–1.20. The "relative viscosity" is the value obtained by dividing the efflux time of a solution of the polymer by the efflux time of a solvent used to form the solution. The efflux times are measured according to the procedure of ASTM-D-445-46-T, Method B. The polymer solution comprises 0.25 gram of the polymer dissolved in 50 cubic centimeters of solvent. Ethylene dichloride is the solvent. The efflux times are measured at 25° C. in a standard apparatus, sold under the designation of a modified Ostwald viscometer.

The backbone of the vinyl oxazoline polymer can be of any type of copolymerizable ethylenically unsaturated monomers. Typical monomers that can be used are, for example, aromatic hydrocarbons having vinylidene groups such as styrene, alkyl substituted styrene, such as α-methyl styrene; acrylonitrile; esters of acrylic acid and methacrylic acid, such as methyl methacrylate, ethyl methacrylate, propyl methacrylate, butyl methacrylate, hexyl methacrylate, cyclohexyl methacrylate, 2-ethylhexyl methacrylate, and the like. One preferred group of monomers are alkyl methacrylates having 1–8 carbon atoms in the alkyl group since these polymers form a high quality product. A small amount of ethylenically unsaturated carboxylic acids can also be used in the backbone, such as acrylic acid, methacrylic acid, crotonic acid, itaconic acid, maleic acid and the like.

Up to 20% by weight, based on the weight of the polymer, of hydroxy alkyl methacrylate or hydroxy alkyl acrylate monomers can be polymerized into the backbone of the polymer. Preferably, about 5–10% by weight of the hydroxyl containing monomers are used.

Typical hydroxy alkyl acrylates and methacrylates contain 2 to 4 carbon atoms in the alkyl group and are, for example, hydroxy ethyl acrylate, hydroxy propyl acrylate, hydroxy butyl acrylate, hydroxy ethyl methacrylate, hydroxy propyl methacrylate, hydroxy butyl methacrylate and the like. Preferred to hydroxy ethyl acrylate.

Particularly useful monomer combinations which form the backbone of the vinyl oxazoline polymer used in this invention and which give a high quality polymer are, for example, styrene, methyl methacrylate, 2-ethylhexyl methacrylate, cyclohexyl methacrylate, butyl methacrylate and mixtures thereof.

The amino ester groups of the vinyl oxazoline polymer used in this invention comprise about 0.5–15% by weight of the polymer and are provided by alkyl amino acrylates or methacrylates of the formula:

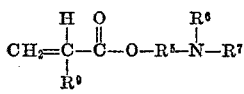

in which

R$^5$ is an aliphatic hydrocarbon group having 1–6 carbon atoms,

R$^6$ and R$^7$ are either hydrogen, or an aliphatic saturated hydrocarbon group having 1–6 carbon atoms, and R$^9$ is either hydrogen or methyl.

Typical alkyl amino acrylates or methacrylates that are used to form the polymer used in this invention are:

dimethylaminoethyl methacrylate,
diethylaminoethyl methacrylate,
dipropylaminoethyl methacrylate,
methylethylaminoethyl methacrylate,
butylaminoethyl methacrylate,
tertiarybutylaminoethyl methacrylate,
diethylaminopropyl methacrylate,
diethylaminobutyl methacrylate,
diethylaminopentyl methacrylate,
diethylaminohexyl methacrylate, and the like. Preferred are diethylaminoethyl methacrylate and tertiary butylaminoethyl methacrylate, since these compounds form a high quality product and are readily available.

The oxazoline ester of the polymer used in this invention comprises about 3–35% by weight of the polymer and is provided by the following monomer which is polymerized into the polymer backbone which is of the following formula

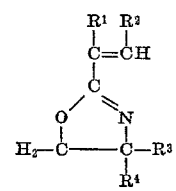

wherein

R$^1$ is a hydrocarbon group having 2–20 carbon atoms,
R$^2$ is either hydrogen or an alkyl group having 1–4 carbon atoms,
R$^3$ and R$^4$ are either hydrogen or an alkyl group having 1–4 carbon atoms or

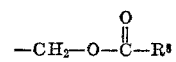

R$^8$ is a hydrocarbon group having 3–21 carbon atoms.

Preferably, R$^1$ and R$^8$ are unsaturated aliphatic hydrocarbon groups which are from drying oil fatty acids and R$^2$ is hydrogen. Preferred drying oil fatty acids that are used to prepare the above oxazoline esters are linseed oil fatty acids, tall oil fatty acids and dehydrated castor oil fatty acids.

These oxazoline esters can be made according to Purcell U.S. Pat. 3,248,397, issued Apr. 26, 1966. One preferred compound of this type is a reaction product of 1 mol of tris-(hydroxymethyl)-amino methane and 3 mols of tall oil fatty acids which is subsequently reacted with formaldehyde. This compound is currently sold under the trademark of "Chemacoil TA 100." Another preferred compound is made as above except linseed oil fatty acids are substituted for the tall oil fatty acids.

The process for making the polymer used in this invention comprises blending in a typically useful solvent about 3–35% of the aforementioned vinyl oxazoline ester, 0.5–15% of an alkyl amino acrylate or methacrylate and about 50–96.5% by weight of copolymerizable ethylenically unsaturated monomers. This mixture is then reacted at about 50–200° C. for about 1–6 hours to form a polymer which has a relative viscosity in the aforementioned range of 1.03–1.30.

The following are typical solvents that can be used in the process for preparing the polymer or can be subsequently used to dilute the polymer composition to form a paint composition: acetone, 2-nitro-propane, methylethyl ketone, amyl alcohol, ethylene glycol monoethyl ether acetate, ethyl acetate, ethyl alcohol, isopropanol, ethylene dichloride, diacetone alcohol, diisobutyl ketone, cyclohexanone, amyl acetate, ethylene glycol monobutyl ether, furfural, petroleum naphtha, toluene, xylene, substituted benzene, benzene, substituted toluene, hexane, aromatic hydrocarbons high boiling petroleum naphthas, high solvency petroleum hydrocarbons, diethyl ether, methyl amyl acetate, butanol and the like.

Preferred polymerization catalysts that are used to prepare the vinyl oxazoline polymers used in this invention are azo type catalysts, such as azobisisobutyronitrile and the like. The amount of catalyst used preferably is about 0.01–2% by weight based on the weight of the monomers.

The alkyd resin used to prepare a coating composition of this invention has an acid number of about 2–25, and preferably, about 5–14, and is about 5–7 acid number units from the gel point of the alkyd resin.

These alkyd resins are of the typical type which are the esterification product of drying oil fatty acids, a polyhydric alcohol, a dicarboxylic acid and an aromatic monocarboxylic acid.

Typical drying oil fatty acids are chinawood oil, linseed oil, soya oil, tall oil fatty acid, and dehydrated castor oil fatty acids.

Typical polyhydric alcohols that can be used to prepare the alkyd resin used in this invention are glycerine, pentaerythritol, trimethylolethane, trimethylol propane; glycols, such as ethylene glycol, propylene glycol, butane diol, pentane diol and the like.

Typical dicarboxylic acids or anhydrides that can be used to prepare the alkyd resin are phthalic acid, phthalic anhydride, isophthalic acid, terephthalic acid, maleic acid, maleic anhydride, fumaric acid and the like. Typical monocarboxylic aromatic acids are benzoic acid, paratertiary butylbenzoic acid, phenol acetic acid, triethyl benzoic acid and the like.

One preferred alkyd resin is a reaction product of an acrylic polymer and an alkyd resin. The alkyd resin portion of the polymer can be of any of those described above while the acrylic portion of the polymer is an ester of acrylic acid or methacrylic acid, acrylonitrile and can contain styrene and also contains a small amount, i.e., 0.5–5%, of an ethylenically unsaturated monocarboxylic or dicarboxylic acid, such as methacrylic acid, acrylic acid, itaconic acid, and the like. The acrylic ester portion of the polymer is prepared initially and blended and is then reacted with the alkyd resin in the early state of the alkyd resin preparation. The polymer is formed by using conventional polymerization techniques. One preferred polymer of this type is a styrene, methyl methacrylate, methacrylic acid and the alkyd portion is of a linseed oil fatty acid, benzoic acid, pentaerythritol and phthalic anhydride.

An acrylic resin can be used in place of the alkyd resin to form the novel coating composition of this invention. The acrylic resin preferably has a relative viscosity, measured as described above, of about 1.02–1.06. The acrylic resin can be of esters of acrylic or methacrylic acid, acrylonitrile, an aromatic hydrocarbon having α-β-vinyl unsaturation, such as styrene or mixtures thereof. The acrylic resin can also contain hydroxyalkyl methacrylate or acrylate, such as hydroxyethyl acrylate or hydroxypropyl methacrylate. Also, small amounts of an α-β-unsaturated carboxylic acid, such as acrylic acid or methacrylic acid, can be used in the acrylic resin. One preferred acrylic resin is of styrene, butyl acrylate, hydroxyethyl acrylate and acrylic acid.

Preferably, the novel coating composition of this invention is pigmented and contains pigment in a pigment to binder ratio of about 1:100 to about 75:100. The term "binder" refers to the film-forming constituents in the novel coating composition. Examples of the great variety of pigments which are used in the novel coating composition of this invention are metallic oxides, preferably titanium dioxide, zinc oxide, iron oxide and the like, metal hydroxides, metal flakes, such as aluminum flake or bronze flake, metal powders, chromates, such as lead chromate, sulfides, sulfates, carbonates, carbon black, silica, talc, china clay, lead blues, iron blues, organic reds, organic maroons, and other organic dyes and lakes.

The pigments can be introduced into the coating composition by first forming a mill base with the alkyd resin or the vinyl oxazoline polymer of this invention by conventional sand grinding or ball mill techniques, and then blending the mill base with the film-forming polymers as shown in the following examples.

Plasticizers in amounts up to 10% by weight, based on the weight of binder can be used in the novel composition of this invention. Plasticizers that can be used are benzylbutyl phthalate, dibutyl phthalate, triphenyl phosphate, 2-ethylhexylbenzyl phthalate, dicyclohexyl phthalate, diallyl phthalate, dibenzyl phthalate, butylcyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide, the di-2-ethyl-hexyl ester of hexamethylene diphthalate, di(methylcyclohexyl)phthalate. One preferred plasticizer of this group is butyl benzyl phthalate since it forms a coating with excellent balance of properties.

Small amounts of conventional metallic driers are used in the novel coating composition, such as lead naphthenate, manganese naphthenate, cobalt naphthenate, lead tallate, nickel salts, such as nickel octoate and the like.

For best results, the coating composition is added to the acid catalyst solution and blended therewith only a short time before the composition is used. About 0.1–4.0% by volume, based on the volume of the coating composition, of the catalyst solution is used. Preferably, about 1.0–3.0% by volume of the catalyst solution is used.

The acid catalyst solution comprises about 1–50% by weight, based on the weight of the solution, of the alkyl acid phosphate in which the alkyl group has 1–12 carbon atoms and about 99–50% by weight of an organic solvent for the catalyst which is compatible with the coating composition. Any of the aforementioned solvents can be used.

Preferably, the acid catalyst solution contains:

10–30% by weight of an alkyl acid phosphate in which the alkyl group has 2–6 carbon atoms;
20–40% by weight of an organic plasticizer; and
50–70% by weight of an aromatic solvent, such as xylene or toluene.

Any of the aforementioned plasticizers can be used but phthalate ester plasticizers are preferred. One particularly useful plasticizer is butyl benzyl phthalate.

The alkyl acid phosphate catalysts can be a monoalkyl acid phosphate, a dialkyl acid phosphate or a mixture of mono and dialkyl acid phosphates. The following are typical alkyl acid phosphates that are used:

methyl acid phosphate,
ethyl acid phosphate,
propyl acid phosphate,
butyl acid phosphate,
pentyl acid phosphate,
hexyl acid phosphate,
octyl acid phosphate,
nonyl acid phosphate,
decyl acid phosphate,
lauryl acid phosphate.

The above can be mono or dialkyl acid phosphates or mixtures thereof.

One preferred acid catalyst is butyl acid phosphate which is a blend of monobutyl and dibutyl acid phosphate and has an acid number of 118–143.

The novel coating compositions of this invention can be applied to a variety of substrates, for example, metal, wood, glass, plastics and the like, by any of the usual application methods, such as spraying, electrostatic spraying, dipping, brushing, roller coating, flow coating and the like. By choosing the desirable solvents and by varying the ratio of solvents used, the coating composition can be provided with the physical properties required for the aforementioned application methods. These coatings can be air dried or baked at a relatively low temperature of about 65–140° C. for about 15 minutes to 2 hours. The resulting coating is about 0.1–5 mils thick, preferably 2–4 mils thick, and has good gloss and can be rubbed or polished in accordance with conventional techniques, if desired, to improve smoothness or apparent gloss or both. The novel coating composition of the invention gives a non-yellowing, hard, durable, scratch resistant, weather resistant, glossy coating which is suitable for auto bodies, truck bodies, repair of auto bodies and truck bodies, airplanes, railroad equipment, appliances, vending machines, outdoor equipment and the like.

Another unique characteristic of the novel coating composition of this invention is that the coating, after application and a short air dry or bake period, can be recoated or a second color can be applied for two-toning without lifting. This characteristic makes it easy to repair and recoat with a second coat.

The rapid curing to a glossy finish, the excellent adhesion to substrates and the non-yellowing properties are the characteristics of the coating composition of this invention that make it particularly useful for repair and refinish of autos and trucks. Also, the novel coating composition is suitable for repairing all types of coated metal substrates, such as metals coated with acrylic lacquers, nitrocellulose, lacquers, alkyd-melamine paints and the like.

The examples illustrate the invention. All quantities shown are on a weight basis unless otherwise indicated.

EXAMPLE 1

Preparation of acrylic-vinyl oxazoline ester polymer

| | Parts by wt. |
|---|---|
| Portion 1: | |
| Toluene | 176.0 |
| Acetone | 84.8 |
| Portion 2: | |
| Methyl methacrylate | 169.5 |
| Butyl methacrylate | 213.2 |
| Tertiary butylaminoethyl methacrylate | 29.1 |
| Vinyl oxazoline ester of linseed oil fatty acids (reaction product of 1 mole of tris-(hydroxymethyl)-aminomethane with 3 moles of linseed oil fatty acids which is subsequently reacted with 1 mole of formaldehyde using the process of U.S. Pat. 3,248,397, issued Apr. 26, 1966) | 72.6 |
| Azobisobutyronitrile | 3.6 |
| Portion 3: Azobisisobutyronitrile | 1.2 |
| Portion 4: Azobisisobutyronitrile | 1.2 |
| Portion 5: Azobisisobutyronitrile | 1.2 |
| Portion 6: Toluene | 62.0 |
| Total | 815.4 |

Portion 1 is charged into a reaction vessel equipped with a stirrer and reflux condenser and the ingredients are heated to about 70–75° C. Portion 2 is premixed and slowly added at an even and continuous rate to the reaction vessel over a 2-hour period, while maintaining the reaction mixture at its reflux temperature which varies about 70–82° C. The reaction mixture is maintained at its reflux temperature for about 1 hour, and then Portion 3 is added and the reaction is refluxed an additional hour.

Portion 4 is then added and the mixture is again refluxed for an additional hour. Portion 5 is then added and the mixture is refluxed for an additional 2 hours, or until the total polymer solids of the solution reaches at least 63%. The heat is then removed from the reaction vessel and Portion 6 is added.

The resulting polymer solution has a Gardner Holdt viscosity of X–Z measured at 25° C. and a solids content of about 58%.

The polymer is the reaction product of

| | Percent by wt. |
|---|---|
| Methyl methacrylate | 35 |
| Butyl methacrylate | 44 |
| Tertiary butylaminoethyl methacrylate | 6 |
| Vinyl oxazoline ester of linseed oil fatty acid | 15 |
| Total | 100 |

An alkyd resin is prepared as follows:

| | Parts by wt. |
|---|---|
| Portion 1: | |
| Linseed oil fatty acids | 178.6 |
| Benzoic acid | 59.8 |
| Pentaerythritol | 123.8 |
| Phthalic anhydrid | 63.3 |
| Dibutyl tin oxide | 0.6 |
| Xylene | 21.3 |
| Portion 2: | |
| Phthalic anhydride | 68.7 |
| Xylene | 2.8 |
| Portion 3: Xylene | 350.5 |
| Total | 869.4 |

The ingredients of Portion 1 are premixed and charged into a reaction vessel equipped with a reflux condenser and heated to the reflux temperature which is about 166° C. The reaction mixture is maintained at its reflux temperature which may rise to about 218° C. The samples of the reaction mixture are taken periodically to determine the acid number by conventional techniques. When an acid number of about 5–10 is reached, Portion 2 is then added and the reaction mixture is brought back to its reflux temperature which is about 205° C., and the reaction is continued until the polymer attains an acid number of about 10–12. When the aforementioned acid number is reached, Portion 3 is charged into the reaction vessel.

The resulting alkyd resin solution has a polymer solids content of about 55% by weight and the polymer has a Gardner Holdt viscosity of about V–Z measured at 25° C.

The alkyd resin is the esterification product of

| | Percent by wt. |
|---|---|
| Linseed oil fatty acids/pentaerythritol | 41.6 |
| Pentaerythritol benzoate | 15.0 |
| Pentaerythritol phthalate | 39.4 |
| Pentaerythritol | 4.0 |
| Total | 100.0 |

A pigment dispersion is prepared as follows:

| | Parts by wt. |
|---|---|
| Titanium dioxide pigment (sulfate process) | 630.0 |
| Soya glycerol phthalate alkyd resin solution (55% resin solids in which the alkyd is of 43% soya oil, 52% glycerol phthalate, 5% glycerin) | 158.0 |
| Xylene | 212.0 |
| Total | 1000.0 |

The ingredients are premixed and charged into a conventional sand-grinding mill and ground to about a 0.3 mil fineness.

A paint composition is formed by mixing the following ingredients:

| Portion 1: | Parts by wt. |
|---|---|
| Pigment dispersion (63% titanium dioxide dispersed in the soya oil alkyd resin and hydrocarbon solvent) | 188.02 |
| Soya glycerol phthalate alkyd resin solution (55% resin solids, alkyd described in the pigment dispersion) | 26.10 |
| Alkyd resin solution prepared above (55% resin solids) | 136.90 |
| Acrylic-vinyl oxazoline polymer solution prepared above (58% polymer solids) | 302.59 |
| Cobalt naphthenate drier solution (6% cobalt in a hydrocarbon solvent) | 2.68 |
| Manganese naphthenate drier solution (6% manganese in a hydrocarbon solvent) | 0.28 |
| Lead tallate drier solution (24% lead in a hydrocarbon solvent) | 2.68 |
| Hydrocarbon solvent (boiling point 189–219° C., aniline point 28° C.) | 34.43 |
| Naphtha solvent (boiling point 100–163° C.) | 79.56 |
| Portion 2: Hydrocarbon solvent (boiling point 150–190° C., aniline point −28° C.) | 79.12 |
| Total | 852.36 |

Portion 1 is mixed for about 1 hour and then Portion 2 is added.

A catalyst solution then is prepared by blending together the following ingredients:

| | Parts by wt. |
|---|---|
| Butyl acid phosphate solution (29.7% solids in xylol having an acid number of 118–143) | 50.0 |
| Butyl benzyl phthalate | 37.5 |
| Xylol | 12.5 |
| Total | 100.0 |

To the above paint composition, about 2% by volume, based on the volume of the paint composition, of the above catalyst solution is added and the catalyst solution is thoroughly blended with the paint composition.

The above paint composition is reduced to a spray viscosity using an aromatic hydrocarbon solvent. A coating of about 2 mils thick of the paint composition is sprayed onto each of the following sets of panels: autobody steel panels which had been primed with pigmented alkyd primer; steel panels coated with an acrylic lacquer; steel panels coated with a pigmented epoxy primer; steel panels coated with a thermosetting acrylic enamel; steel panels coated with an alkyd enamel; steel panels coated with an alkyd melamine enamel. Several of the thermosetting acrylic enamel panels and the alkyd enamel panels and the alkyd melamine panels are sanded and the other panels are unsanded before the paint composition is applied. The paint is baked at 125° C. about 30 minutes and in each case, a tough, durable film having excellent gloss, adhesion and appearance is formed. Unacceptable yellowing of the panels is not noted.

Several panels of each of the above sets are subjected to a high-humidity-low temperature crack test which consists of 4 cycles. In each cycle, the panels are subject to (1) 100% relative humidity and 100° F. for 24 hours, (2) −10° F. for 24 hours and (3) room temperature for 4 hours. At the completion of each cycle, the panels are examined with a magnifying glass for cracks. At the end of the test, the above panels showed no cracking or dulling or yellowing and no loss in adhesion to the substrate is noted.

Several panels of each of the above sets are exposed in Florida at a 45° angle facing south. The panels are examined after 4 and 8 months. After 8 months of weathering, each of the panels showed good color retention without yellowing, excellent gloss, very little chalking and water spotting, and no loss of adhesion to the substrate.

In contrast, the above paint composition is sprayed onto the identical substrates except the acid catalyst solution is not added. In each case, the coated substrate is baked as above. The resulting coating was not acceptable since the coating yellowed slightly or had an off-white color.

EXAMPLE 2

An acrylic-vinyl oxazoline ester is prepared as follows:

| Portion 1: | Parts by wt. |
|---|---|
| Toluene | 240.3 |
| Methylethyl ketone | 62.0 |
| Methyl methacrylate monomer | 98.5 |
| Butyl methacrylate monomer | 81.3 |
| 2-hydroxyethyl acrylate monomer | 17.2 |
| 2-diethylaminoethyl methacrylate monomer | 12.3 |
| Vinyl oxazoline ester of linseed oil fatty acids (described in Example 1) | 36.9 |
| Portion 2: | |
| Methyl methacrylate monomer | 98.5 |
| Butyl methacrylate monomer | 81.3 |
| 2-hydroxyethyl acrylate monomer | 17.2 |
| 2-diethylaminoethyl methacrylate monomer | 12.3 |
| Vinyl oxazoline ester of linseed oil fatty acid described above) | 36.9 |
| Azobisisobutyronitrile | 7.4 |
| Portion 3: | |
| Azobisisobutyronitile | 5.4 |
| Methylethyl ketone | 24.6 |
| Total | 832.1 |

Portion 1 is charged into a reaction vessel equipped with a stirrer and a reflux condenser and the ingredients are heated to the reflux temperature which is about 100–110° C. Portion 2 is premixed and added to the reaction mixture as follows:

20% of Portion 2 is slowly and continuously added over a 30 minute period and then 80% of Portion 2 is added slowly and continuously over a 50 minute period; for each addition, the reaction mixture is maintained at the reflux temperatures. After Portion 2 is added, Portion 3 is slowly and continuously added to the reaction mixture over a 30 minute period while holding the reaction mixture at its reflux temperature. The reaction mixture is then held at about 50° C. for an additional 30 minutes and then filtered.

The resulting polymer solution has a 60% polymer solids content and a Gardner Holdt viscosity of W–Y measured at 25° C.

The polymer is the reaction product of

| | Percent by wt. |
|---|---|
| Methyl methacrylate | 40 |
| Butyl methacrylate | 33 |
| 2-hydroxyethyl acrylate | 7 |
| 2-diethylaminoethyl methacrylate | 5 |
| Vinyl oxazoline ester of linseed oil fatty acids | 15 |
| Total | 100 |

An alkyd resin is prepared as follows:

| Portion 1: | Parts by wt. |
|---|---|
| Tung oil | 52.50 |
| Dehydrated castor oil fatty acids | 442.00 |
| Benzoic acid | 99.25 |
| Pentaerythritol | 316.50 |
| Phthalic anhydride | 299.50 |
| Dibutyl tin oxide | 0.93 |
| Xylene | 60.75 |
| Portion 2: Xylene | 228.75 |
| Portion 3: Phthalic anhydride | 16.50 |
| Portion 4: Xylene | 646.25 |
| Total | 2162.93 |

Portion 1 is charged into a reaction vessel equipped with a stirrer and a reflux condenser and the ingredients are heated to the reflux temperature which is about 180° C. at the start of the reaction and which rises to about 240° C. at the end of the reaction. The reaction is continued until an Acid No. of 5-7 is reached. The reaction mixture is then cooled to 160° C. and Portion 2 is added. Portion 3 is added next and the temperature of the reaction mixture is held at about 160° C. for about 30 minutes. Portion 4 is added and the reaction mixture is cooled to room temperature and filtered.

The resulting alkyd resin solution has a polymer solids content of about 55% by weight and the polymer has a Gardner Holdt viscosity of 25° C. of about W-Y.

The polymer is the product of

| | Percent by wt. |
|---|---|
| Tung oil | 4.6 |
| Dehydrated castor oil fatty acids/pentaerythritol | 41.2 |
| Pentaerythritol benzoate | 10.0 |
| Pentaerythritol phthalate | 37.7 |
| Pentaerythritol | 6.5 |
| Total | 100.0 |

A paint composition is formed by using the same ingredients in the same proportions as in Example 1 except the above prepared acrylic-vinyl oxazoline ester solution is substituted for the ester solution used in Example 1 and similarly the above alkyd resin solution is substituted for the alkyd resin solution used in Example 1.

The above paint composition is blended with 2% by volume of the catalyst solution of Example 1 and the paint is reduced to a spray viscosity and applied as in Example 1 using the same primed, coated and uncoated steel substrates and baked as in Example 1. In each case, a tough, durable, weatherable finish results having excellent gloss and appearance and good adhesion to the substrate. The panels do not have unacceptable yellowing even after outdoor exposure to sunlight for extended periods.

What is claimed is:

1. In a coating composition comprising 5-60% by weight of a polymer blend and 95-40% by weight of a solvent for the polymer blend in which the blend consists essentially of
   (1) 40-95% by weight of an acrylic vinyl oxazoline ester polymer that has a relative viscosity of about 1.03-1.30 measured according to ASTM-D-445-46-T, Method B at 25° C. and which consists essentially of a backbone of 50-96.5% by weight, based on the weight of the polymer, of polymerized ethylenically unsaturated monomers selected from the group consisting of an alkyl methacrylate having 1-8 carbon atoms in the alkyl group, cyclohexyl methacrylate, acrylonitrile, styrene and mixtures of these monomers and the backbone contains 0.20% by weight, based on the weight of the polymer, of a hydroxy containing compound selected from the group consisting of hydroxy alkyl methacrylate and a hydroxy alkyl acrylate having 2-4 carbon atoms in the alkyl groups and containing in the backbone 3-35% by weight, based on the weight of the polymer, of polymerized vinyl oxazoline esters of the formula

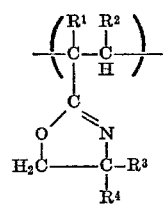

and having attached to the polymer backbone 0.5- 15% by weight, based on the weight of the polymer, of pendent amino ester groups of the formula

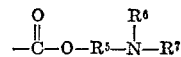

wherein
R¹ is a hydrocarbon group having 2-20 carbon atoms;
R² is selected from the group consisting of hydrogen and an alkyl group having 1-4 carbon atoms;
R³ and R⁴ are

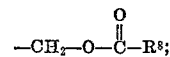

R⁵ is an aliphatic hydrocarbon group having 1-6 carbon atoms;
R⁶ and R⁷ are individually selected from the group consisting of hydrogen, a saturated aliphatic hydrocarbon group having 1-6 carbon atoms; and
R⁸ is from drying oil fatty acids, and correspondingly
(2) 5-60% by weight of an alkyd resin or a blend of alkyd resins;

wherein the alkyd resin is the esterification product of drying oil fatty acids, a polyhydric alcohol and an aromatic dicarboxylic acid or an anhydride thereof or a mixture of an aromatic dicarboxylic acid and an anhydride of an aromatic dicarboxylic acid; the improvement therewith comprising 0.1-4.0% by volume, based on the volume of said coating composition, of an acid catalyst solution blended with said composition which acid catalyst solution comprises:
1-50% by weight of an alkyl acid phosphate having 1-12 carbon atoms in the alkyl group and correspondingly 99-50% by weight of an organic solvent for the catalyst and the catalyst solution has an acid number of about 4-250.

2. The coating composition of claim 1 containing pigment in a pigment to binder ratio of about 1:100 to about 75:100.

3. The coating composition of claim 2 in which the polymer blend consists essentially of
50-75% by weight of said acrylic vinyl oxazoline ester polymer and 50-25% by weight of an alkyd resin.

4. The coating composition of claim 3 in which the acid catalyst solution contains an organic plasticizer.

5. The coating composition of claim 4 in which acid catalyst solution consists essentially of
10-30% by weight of an alkyl acid phosphate in which the alkyl group has 2-6 carbon atoms;
20-40% by weight of a phthalate ester plasticizer and
50-70% by weight of an aromatic hydrocarbon solvent.

6. The coating composition of claim 5 in which the alkyl acid phosphate is butyl acid phosphate and the plasticizer is butyl benzyl phthalate.

7. The coating composition of claim 6 in which the backbone of said vinyl oxazoline ester polymer is of an alkyl methacrylate in which the alkyl group has 1-8 carbon atoms, R² is hydrogen, R⁵ is a saturated aliphatic hydrocarbon group containing 2-4 carbon atoms, and R⁶ and R⁷ are individually selected from the group consisting of hydrogen and a saturated aliphatic hydrocarbon group containing 1-4 carbon atoms and in which the alkyd resin is the esterification product of a drying oil fatty acid, a polyhydric alcohol and an aromatic carboxylic acid or anhydride.

8. The coating composition of claim 7 in which the backbone of said vinyl oxazoline polymer is of butyl methacrylate and methyl methacrylate, R¹ and R⁸ are from linseed oil fatty acids, $R^5$ is an ethylene group, $R^6$ is hydrogen, $R^7$ is a tertiary butyl group, the alkyd resin is the esterification product of linseed oil fatty acids, benzoic acid, pentaerythritol and phthalic anhydride.

9. The coating composition of claim 8 in which the butyl acid phosphate catalyst solution has an acid number of 118–143.

10. The coating composition of claim 1 in which the backbone of said vinyl oxazoline ester polymer is of methyl methacrylate, butyl methacrylate and hydroxyethyl acrylate, $R^1$ and $R^8$ are from linseed oil fatty acids, $R^5$ is an ethylene group, $R^6$ and $R^7$ are ethyl groups and the alkyd resin is the esterification product of tungoil, dehydrated castor oil fatty acids, benzoic acid, pentaerythritol and phthalic anhydride.

11. A metal substrate coated with a dried coalesced layer of the composition of claim 1.

References Cited
UNITED STATES PATENTS 3,248,397  4/1966  Purcell _____ 260—307 F
3,585,160  6/1971  Miller et al. _____ 260—22 CB DONALD E. CZAJA, Primary Examiner R. W. GRIFFIN, Assistant Examiner U.S. Cl. X.R.

117—75, 132 B, 161 K, 161 UZ; 260—22 CB, 23 P, 30.6 R, 31.6, 31.8 M, 33.6 R, 33.6 NA, 873